United States Patent
Andoh et al.

(10) Patent No.: US 6,301,644 B1
(45) Date of Patent: Oct. 9, 2001

(54) METHOD FOR MANAGING DEFECT SECTORS OF INFORMATION STORAGE MEDIUM, AND APPARATUS FOR USE WITH THE METHOD

(75) Inventors: Haruo Andoh, Zama; Toru Aida, Yamato, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/069,034

(22) Filed: Apr. 27, 1998

(30) Foreign Application Priority Data

Apr. 28, 1997 (JP) .................................................. 9-111514

(51) Int. Cl.7 .................................................. G06F 12/00
(52) U.S. Cl. ................. 711/201; 711/4; 711/112
(58) Field of Search ................. 711/4, 112, 201; 365/185.11; 369/54

(56) References Cited

U.S. PATENT DOCUMENTS

| | | | |
|---|---|---|---|
| 5,235,585 | * 8/1993 | Bish et al. | 369/54 |
| 5,838,614 | * 11/1998 | Estakhri et al. | 365/185.11 |
| 5,890,209 | * 3/1999 | Dobbek | 711/112 |
| 5,983,309 | * 11/1999 | Atsatt et al. | 711/4 |

* cited by examiner

Primary Examiner—Tuan V. Thai
Assistant Examiner—Pierre M Vital
(74) Attorney, Agent, or Firm—Altera Law Group, LLC (57) ABSTRACT

A method and apparatus for relocating the data in defect sectors having occurred in the storage medium of an information recording and reproducing apparatus is described. If a defect occurs in a sector of a user area, the data of it is relocated to a temporary storage area. The logical block addresses (LBA's) for a group of sectors including an alternate sector are sequentially reassigned by skipping the defective sector and including the alternate sector. Data in the group of sectors are read out from the rear part of the user area according to current LBAs, and written according to new LBAs. Since the addresses of new LBAs are smaller than those of current LBAs by the number of defect sectors, the original data is not destroyed in the writing.

8 Claims, 11 Drawing Sheets

Track and PDM before user data writing

Current PDM/RDM and track

New PDM/RDM and track for performing rearrangement by the present invention

Correced PDM/RDM and track for performing rearrangement by the present invention

METHOD FOR MANAGING DEFECT SECTORS OF INFORMATION STORAGE MEDIUM, AND APPARATUS FOR USE WITH THE METHOD

BACKGROUND OF THE INVENTION

1. Field of the Invention

The present invention is related to information recording and reproducing apparatus such as a magnetic disk storage apparatus and an optical disk storage apparatus, and particularly to the management of defect sectors occurring in the information storage medium used in such apparatus.

2. Description of Related Art

The recording area of the information storage medium used in a magnetic disk storage apparatus, an optical disk storage apparatus and the like is typically divided into a plurality of concentric annular tracks or a single spiral track, and each track is divided into sectors of a predetermined length. To identify the address of each sector on the information storage medium, an identifier consisting of a sector number, track number, and head number are stored in each sector, enabling the head to read those identifiers to access a desired sector.

Figure 1A:
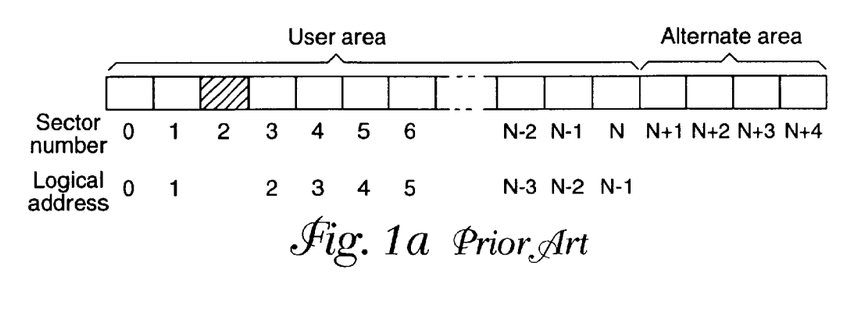
FIGS. 1(a)–(c) are schematic representations of a track for explaining the background art.

FIG. 1(a) is an image of a track for a magnetic disk, and it consists of a user area and an alternate area. Since the magnetic disk storage apparatus with the magnetic disk is not yet shipped, no user data is recorded in the user area. The user area comprises N+1 user sectors of sector numbers 0 to N which are assigned in the order of the physical arrangement of sectors, and each user sector is used for storing user data. The alternate area comprises alternate sectors to be used for storing user data in place of defective user sectors. As to the magnetic disk, in the final inspection of the all sectors in the manufacturing stage, so-called primary defect sectors of low read or write reliability are detected. In FIG. 1(a), the sector number 2 is a primary defect sector detected before the product shipment, and before the user stores programs or data in the disk. Sectors used sequentially according to logical addresses which are assigned skipping the sector number 2. To read the stored data, the head is positioned relative to the disk by a seek or search operation. First, the head is moved in the radial direction of the disk to detect a desired track number, and then the disk rotates and the sectors move relative to the head in the circumferential direction to detect a desired sector number. Since data is stored according to the logical addresses of sectors which are sequentially arranged intra- and inter-tracks, the head can sequentially seek tracks and sequentially search the data as the disk rotates.

Figure 1B:
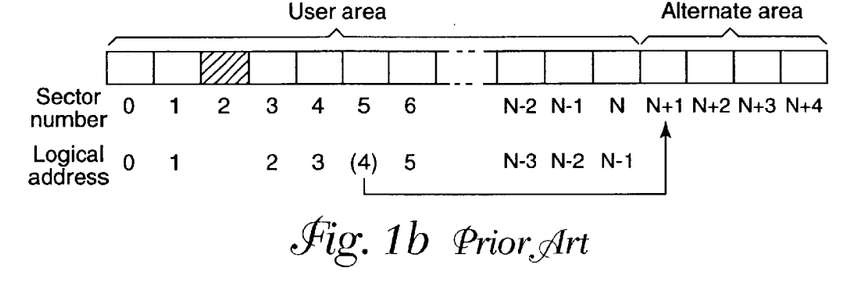

FIG. 1(b) represents a state in which, after a magnetic disk storage apparatus is shipped, a defect occurs in a user sector in which user data is stored (hereinafter referred to as a "secondary defect sector," and the user data is stored in an alternate area. In the recording surface of a disk, deterioration is caused by the rewriting of information or the lapse of time, and reliability is reduced in the reading from or the writing to the sectors in which user data is stored. If a read error occurs in which no successful reading can be made in the normal read mode, the magnetic disk storage apparatus performs a rereading in a special read mode in which the read timing is changed or the head position is finely adjusted, and if it determines that the sector reliability has decreased below a predetermined value, it changes the operation of the apparatus so as to use an alternate sector instead of the defective sector. The sector number 5 in FIG. 1(b) is a sector determined to be a secondary defect sector, and the data stored in the sector number 5 is stored in an alternate sector of a sector number N+1. The sector number 5 and the sector number N+1 are associated by a change of the identifier forming each sector or a table provided in the RAM of the controller, and when the logical address 4 of the sector number 5 is addressed, the head is positioned at the sector number N+1 to read the data stored therein. In the reading of the user data stored in the track of FIG. 1(b), the head sequentially performs a search in the order of the physical arrangement of sectors for the logical addresses 0 to 3, and when it reaches the logical address 4, it moves to the sector number N+1 and then returns to the logical address 5.

The alternate area may be provided in the same track, or may be provided in another track. If the alternate sector exists in the same track, the head needs to wait for the disk rotation when it moves from the logical address 3 to the sector number N+1, and if the alternate sector exists in another track, a waiting time is further required for a change of the retrieved track by a seek operation. The mechanical operation needed for such retrieval position change largely reduces the transfer rate of the read/write of the magnetic disk storage apparatus.

Figure 1C:
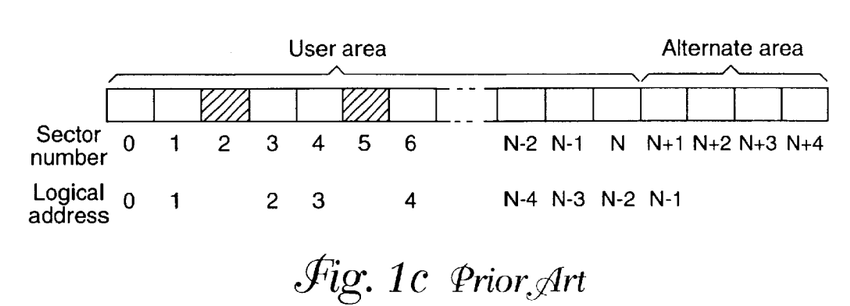

Published Unexamined Patent Application No. 6-111479 discloses an invention for improving the transfer rate of an information recording and reproducing apparatus which has been decreased by the occurrence of secondary defect sectors as shown in FIG. 1(b). This method is to rearrange the data in the alternate sectors to the user area by a slipping process and assign logical addresses as shown in FIG. 1(c). That is, logical addresses are assigned skipping the sector number 5 in which a secondary defect has occurred, and the moving of the head to the alternate area is avoided by moving the head according to the assigned logical addresses. Since the logical addresses of the sector number 6 and the succeeding sectors are all assigned after having one subtracted from them, the user data needs to be rewritten so that the memory contents of the sectors according to the original logical addresses match the memory contents of the sectors according to the changed logical addresses, to maintain the logical addresses recognized by the host computer. In accordance with this background art, to prevent the already stored user data from being destroyed when it is rewritten, a memory capable of storing data for at least N+1 sectors is prepared, all the N+1 user data stored in the sectors related to the rewriting are once stored in the memory, logical addresses are assigned by the slipping process as shown in FIG. 1(c), and thereafter the user data stored in the memory are sequentially written according to the logical addresses.

However, in the above background art, to move the user data in alternate sectors to user sectors, a memory is required which has a capacity for storing all the user data needed to be rewritten, and this technique is applicable only to a disk in which the pair of a user area and an alternate area is divided into relatively small units. The reason is that, if the whole user data in the user area corresponding to a certain alternate area is not stored in the memory, data which has not been moved yet will be overwritten. For instance, if the data in the logical address 5 (sector number 6) in FIG. 1(b) is read and written to the logical address 5 (sector number 7) in FIG. 1(c), the data in the sector number 7 is overwritten though it has not been moved yet. On the other hand, to divide the user area into large units is preferable for reducing the number of unused alternate sectors and effectively utilizing the memory space of the disk. Accordingly, this technique cannot be applied to a disk in which one user area and one alternate area are respectively acquired on the whole surface of one disk or over the whole surface of a plurality of disks.

For the rearrangement as shown in FIG. 1(c) of the sectors of a disk in which the user area is divided into units larger than the capacity which can be stored in the memory, conventionally the user data was sequentially rewritten in increasing order of sector number. At this point, the user data after the secondary defect sector (in this case, the sector number 5) are all overwritten with the data stored in other logical address, and thus the original user data could not be maintained after the rearrangement. Further, if the user data needs to be maintained, all the data were once transferred to another storage device for evacuation, and were written after the logical addresses of the disk were newly assigned.

SUMMARY OF THE INVENTION

Accordingly, it is an object of the present invention to improve the data transfer rate of an information recording and reproducing apparatus in which a secondary defect occurs in a sector and the user data is recorded in an alternate area. In particular, it is an object of the present invention to provide a method for managing defect sectors wherein, in a disk in which the user area is divided into large units, the user data in alternate sectors can effectively be moved to user sectors by using a small memory while maintaining the user data, and an information recording and reproducing apparatus which can execute such management.

Further, it is an object of the present invention to provide a highly reliable and efficient managing method wherein user data is not lost even if an interruption due to a power outage occurs during the management of defects, and when the defect management is resumed, it can be continuously executed from the point at which the interruption has occurred.

The means for solving the above problems are as described in the claims. The method for managing defects in sectors first assigns new logical block addresses (new LBAs), skipping secondary defect user sectors. The individual sectors have absolute block addresses (ABAs) assigned in the order of their physical arrangement regardless of the existence of a defect, whereas the logical block addresses (LBAs) are addresses which are assigned to actually usable sectors, skipping defect addresses, and the host computer identifies an address with the LBA. The secondary defect user sector means a user sector in which a defect occurs after user data has been written. Further, in the present invention, it is assumed that LBAs are sequentially assigned in increasing order, but the idea of the present invention naturally includes the case in which they are sequentially assigned in descending order.

The rearrangement of data according to the new LBAs can increase the transfer rate of data recorded on an information storage medium, but, to prevent already written user data from being destroyed, a predetermined number of sectors are further selected according to the current LBAs in descending order of address from the user sector assigned the largest current LBA. Since the number of sectors can be selected so that they can be stored in a memory, it is not necessary to prepare a large memory. Then, the contents of the user data in the predetermined number of sectors are read, and the read user data is written to user sectors according to the new LBAs. That is, the user data addressed by the current LBAs and read is written to positions addressed by the new current LBAs. Since the new LBAs are assigned skipping secondary defect user sectors, the new LBAs are assigned to sectors having larger ABAs as compared with the current LBAs, and thus, even if the writing is performed with an addressing by the new LBAs, the user sectors storing user data which is not moved yet are not overwritten. Further, a predetermined number of sectors are selected according to the current LBAs in descending order of address from a sector having a current LBA immediately preceding a sector having the smallest current LBA among the selected predetermined number of sectors. In this case the number of sectors to be selected need not always be the same as the number of the sectors selected first. By repeating the above steps, the procedure reading a large capacity of user data with the current LBAs in descending order of address for a small unit and writing it with the new LBAs is repeatedly executed, by which the user data stored in alternate sectors is moved to user sectors according to the new LBAs.

The above procedure is repeated, and when the smallest current LBA among the current LBAs possessed by the user sectors selected to be moved is smaller than the smallest LBA among the current LBAs respectively possessed by secondary defect user sectors, including a predetermined margin, the moving of user data can be terminated. The reason is that, in a sector having a current LBA smaller than the smallest current LBA possessed by the defect user sector, the current LBA is the same as the new LBA and it is not necessary to rewrite the user data. The predetermined margin is determined in consideration of the number of sectors selected to be moved.

In an information storage medium in which user sectors and alternate sectors are adjacently arranged, the user data stored in alternate sectors may be overwritten and destroyed if user data is written according to the new LBAs. Accordingly, the alternate sectors are once relocated to a safe place. The evacuation destination may be an area kept in the information storage medium, or may be another memory. Since the place for storing the relocated user data is associated with secondary defect user sectors, the data in the evacuation destination is read when a secondary defect user sector is addressed.

Further, if the user data related to the moving is once relocated, the data is not lost if a failure has happen when writing the data to the destination address.

The user data related to the moving is moved from a sector addressed by a current LBA to the memory and relocated to a safe place, and it is written to a sector addressed by a new LBA, completing one moving. If an interruption due to power-down occurs during a moving and the moving can be resumed and continued form the interrupted state, an effective defect management can be performed. A control flag is a pointer indicating the position of user data related to the moving, and it shows whether the user data being moved exists in the original position or in the evacuation destination.

The above method for managing defect sectors in the preferred embodiment is implemented by in the apparatus of the present invention. The firmware program is stored in the information storage medium or nonvolatile memory of the information recording and reproducing apparatus, and read and executed by the CPU when defect sectors are processed.

DETAILED DESCRIPTION THE PREFERRED EMBODIMENT

Figure 2A:
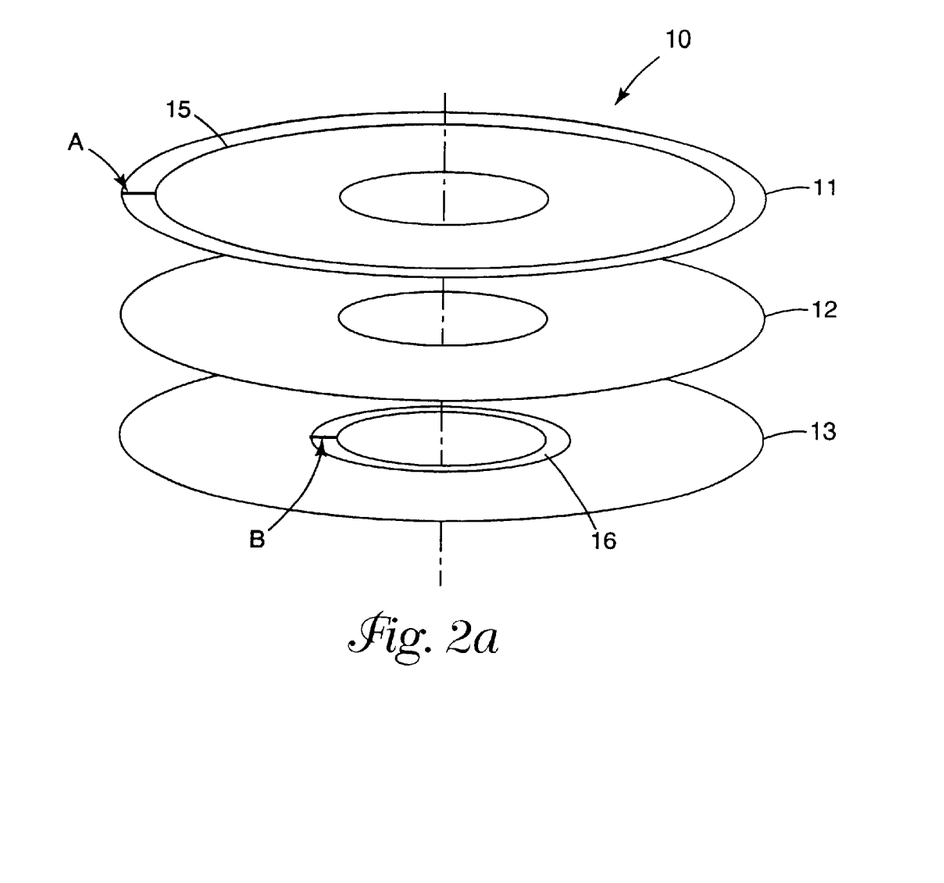
FIGS. 2(a)–(b) illustrate a magnetic disk to which the present invention is applied.

Now, the embodiment of the present invention applied to magnetic disks is described using the drawings. FIG. 2(a) is a schematic representation of a stack of three magnetic disks 10 which are mounted in a magnetic disk storage apparatus, and disks 11 to 13 are fixed to one pivotal shaft (not shown) and integrally rotate. Each disk surface is scanned by a head (not shown) corresponding to it. The planar surface of each disk 10 is divided into a plurality of concentric annular tracks for defining recording locations, and each track is further divided into a plurality of sectors. The respective sectors are assigned absolute block addresses (ABAs) according to their physical arrangement. ABAs first start from the sector at the position A of the outermost track 15 of the disk 11, and after circulating through the track 15 once, they are assigned to the sectors of each track while sequentially circulating through each track toward the inner side, and when the assignment in the disk 11 is all terminated, then the assignment is similarly performed in the disks 12 and 13 and terminated at the sector at the terminal point B of the disk 13.

Figure 2B:
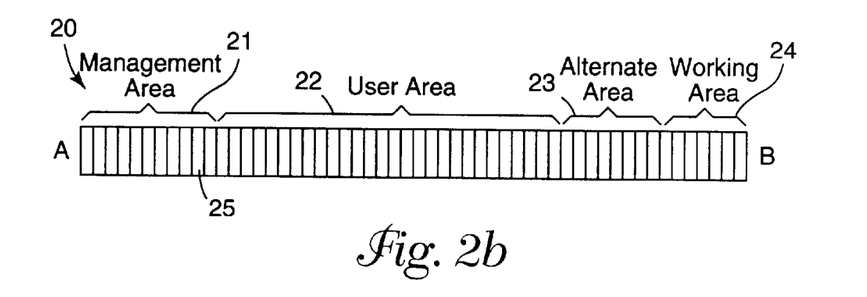

FIG. 2(b) shows the state in which the respective tracks of the disks 11 to 13 are sequentially arranged in the order of ABA to represent them as one track 20. To the respective sectors 25 of the track 20, ABAs are sequentially assigned form the sector at A, and the track 20 is divided into four areas depending on their use. A management area 21 is used to store the firmware program of the present invention, an address management table, etc. A user area 22 is an area made up of user sectors which the user can use to store data. An alternate area 23 is arranged adjacently to the user area 22, and made up of alternate sectors which serve the function of replacing so-called secondary defect user sectors where defects occurred after the user data was stored. A working area 24 is an area which is used to relocate the user data stored in alternate sectors and the user data related to the relocation when the present invention is executed.

Figure 3A:
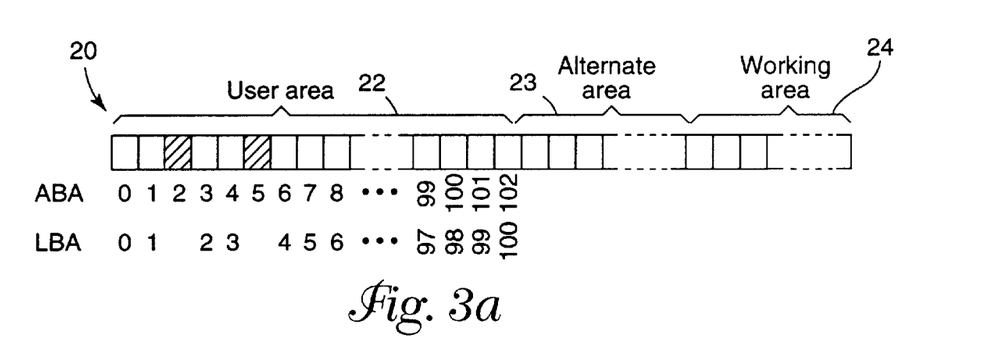
FIGS. 3(a)–(b) illustrate the magnetic disk and PDM before user data is written.
Figure 3B:
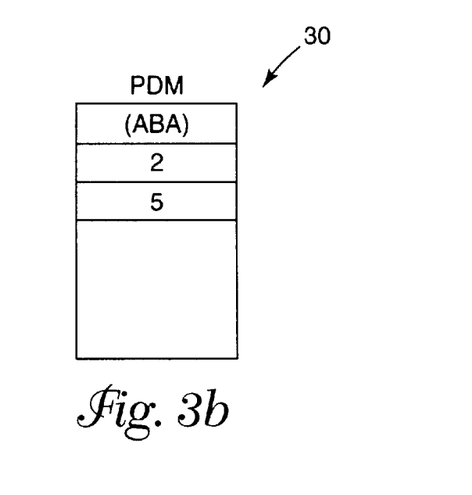

The method for managing addresses which is used in the embodiment of the present invention will be described. In FIG. 3(a), to simplify the subsequent description, the management area 21 is omitted and the ABA of number 0 is started from the first sector of the user area 22. The ABA 2 and ABA 5 are primary defect user sectors found before the magnetic disk storage apparatus was shipped. Further, logical block addresses (LBAs) are sequentially assigned to the individual sectors, skipping the primary defect sectors. The host computer addresses each sector with an LBA, the magnetic disk storage apparatus recognizes an actual sector based on the specified LBA, and the head can be successfully positioned to write data without using defect sectors. Each sector has an area for an identifier, in which data for identifying a cylinder number, head number, and sector number (CHS) is stored. In order that the head is successfully positioned at a desired sector, it is necessary to calculate ABA from LBA and further calculate CHS, and as the management table therefor, a primary defect map (PDM) 30 shown in FIG. 3(b) is prepared. In PDM, the ABAs of primary defect user sectors are stored, and in the example in FIG. 3(a), ABA 2 and ABA 5 are stored.

To calculate the ABA when an LBA is addressed by the host computer, one is added to the LBA for the sector of the smallest ABA stored in the PDM and for the subsequent sectors. Two is added to the LBA for the sector of the second ABA from the smallest ABA stored in the PDM and for the subsequent sectors. The ABA is a number which does not change depending on the existence of defect sectors, and based on the ABA, a CHS can be obtained by a calculation or a mapping table. When the host computer performs an addressing with an LBA, the CPU of the magnetic disk storage apparatus first references the PDM, and the ABA can be calculated from the LBA according to the number of a defect ABA to appropriately position the head at a desired sector.

Figure 4A:
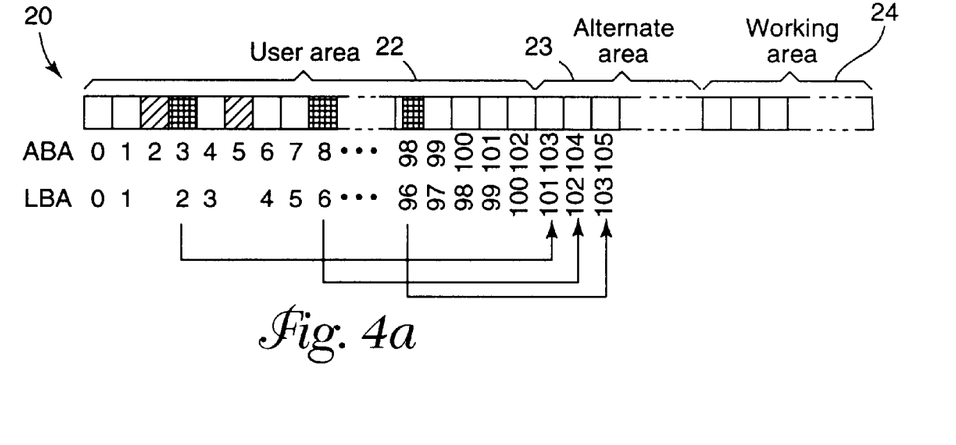
FIGS. 4(a)–(b) illustrate a track in which secondary defect user sectors occurred, and the current PDM and current RDM.
Figure 4B:
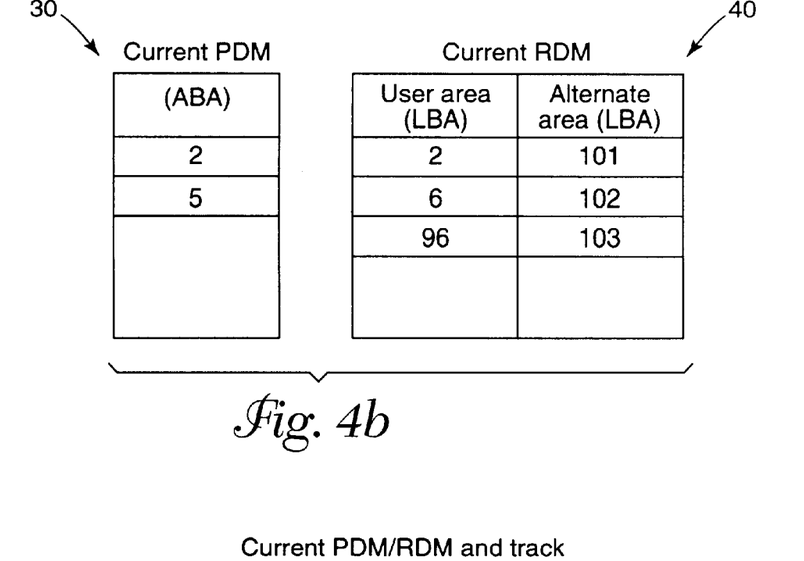

FIGS. 4(a)–(b) show the state in which secondary defect user sectors occurred and the user data in the secondary defect user sectors were transferred to the alternate area 23. Three user sectors, ABA 3 (LBA 2), ABA 8 (LBA 6), and ABA 98 (LBA 96) are the secondary defect user sectors, and the user data stored in these sectors were transferred to three sectors of the alternate area, LBA 101, LBA 102, and LBA 103. Even if a secondary defect user sector occurs and the alternate area is used, the LBA is not changed at this point, a rearrangement defect map (RDM) 40 is provided as a mapping table so that LBA 101, LBA 102, and LBA 103 of the alternate sectors are specified when the host computer specifies LBA 2, LBA 6, and LBA 96. The PDM 30 and the RDM 40 are stored in the management area 21 of the disk. The PDM 30 and the RDM 40 are called a current PDM and a current RDM, respectively, in the since that they indicate tables which are currently effectively used under the control of the magnetic disk storage apparatus.

Figure 8:
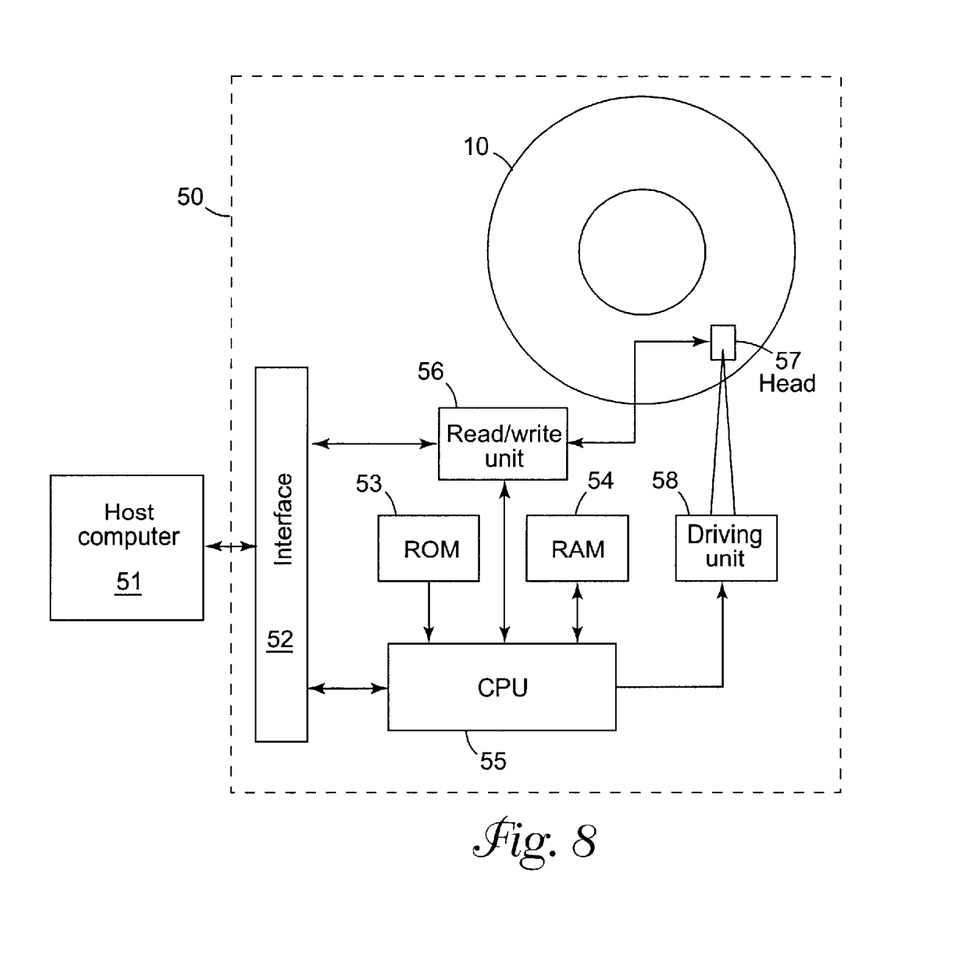
FIG. 8 is a schematic block diagram of a magnetic disk storage apparatus for implementing the present invention.

FIG. 8 is a schematic diagram showing the construction of a magnetic disk storage apparatus 50 in which the rearrangement according to the present invention is executed. A head 57 is mounted on a suspension arm, and it is caused to scan the surface of a magnetic disk 10 by a driving unit 58. Data written to the disk 10 and data read from the disk 10 are transferred between a host computer 51 through a read/write unit 56 and an interface 52. Further, data is also transferred between the magnetic disk 10 and a CPU 55 through the read/write unit. The read/write unit performs bidirectional conversion between a current signal for writing data to the disk 10 and a digital signal which the computer can process. A ROM 53 is connected to the CPU 55, and has stored therein a program for operating the magnetic disk storage apparatus 50. A RAM 54 is connected to the CPU, into which the PDM, the RDM, and the execution program of the present invention are read from the management area 21 of the disk 10 when operating the magnetic disk storage apparatus 50, and user data is read from the user area. When an LBA is specified from the host computer 51, the CPU 55 uses the data of the PDM and RDM stored in the RAM 54 to calculate a CHS, and controls the driving unit 58 so as to position the head 57 at a correct sector.

FIG. 9 shows the RAM 54 divided into four segments. In (a), the segment 0 is the current area of the RAM, and immediately after that, data to be executed by the CPU is stored. The segment 1 is a data area. The segment 2 is an area for storing new PDM/RDM created for executing the defect management according to the present invention. The segment 3 is an area for storing the current PDM/RDM.

Now, the execution procedure of the present invention is described based on a flowchart. If a magnetic disk is used in which the user data in secondary defect user sectors was transferred to alternate sectors, then for instance, when the data of reproduced motion pictures is read, the pictures do not flow smoothly because of the reduction of the data transfer rate. In consideration of this, instructions for starting the defect sector management of the present invention are given to the magnetic disk storage apparatus 50 and the CPU 55 through the host computer 51.

Figure 10:
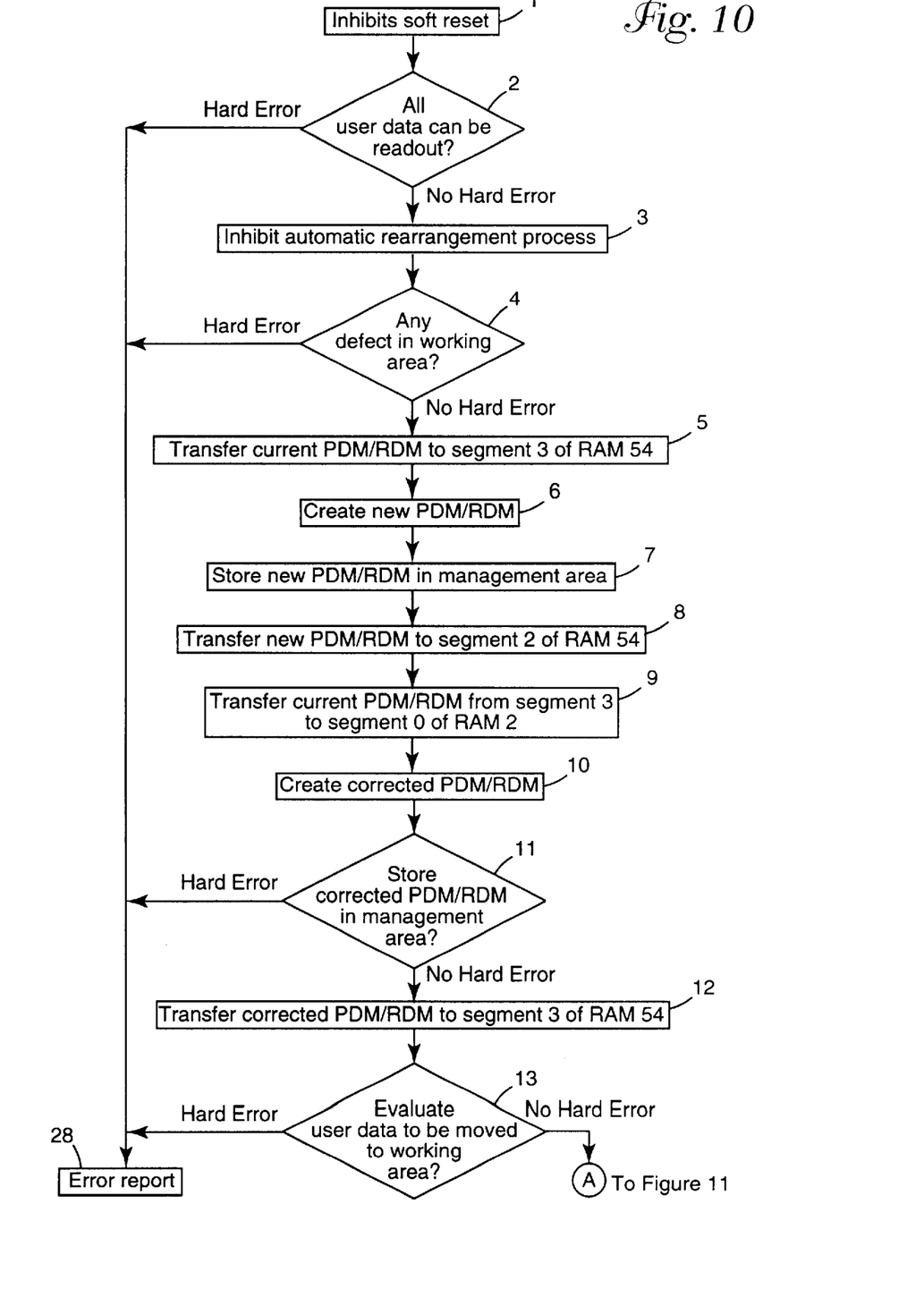
FIG. 10 is a flowchart representing the preparation process for the defect processing of sectors.

FIG. 10 shows a preparation process for starting the defect management. In step (1), the access to the magnetic disk storage apparatus 50 by the host computer 51 is inhibited so that the processing is not interrupted by a command of the host computer 51. In step (2), it is checked whether or not all the user data can be read out, and if there is any user sector which cannot be read, the user data is moved to the alternate area 23 as shown in FIG. 4. In step (3), data is inhibited from being automatically moved to the alternate area 23 shown in FIG. 4 during the processing. In step (4), it is made sure that there is no defect in the sectors of the working area 24 of the disk. The working area 24 is used for the evacuation of the user data stored in the alternate area 23 and the user data for the sectors to be rewritten at a time. In step (5), if the current PDM and RDM have not yet been stored in the segment 3 of the RAM 54, these are read in from the management area 21.

Figure 5A:
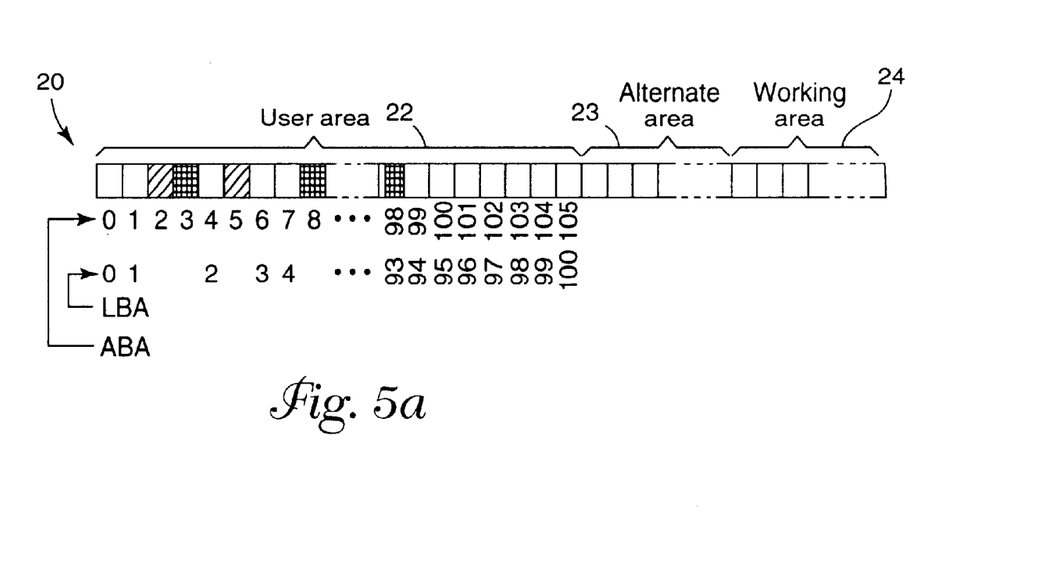
FIGS. 5(a)–(b) illustrate a track in which new LABs are assigned, and the new PDM and new RDM.
Figure 5B:
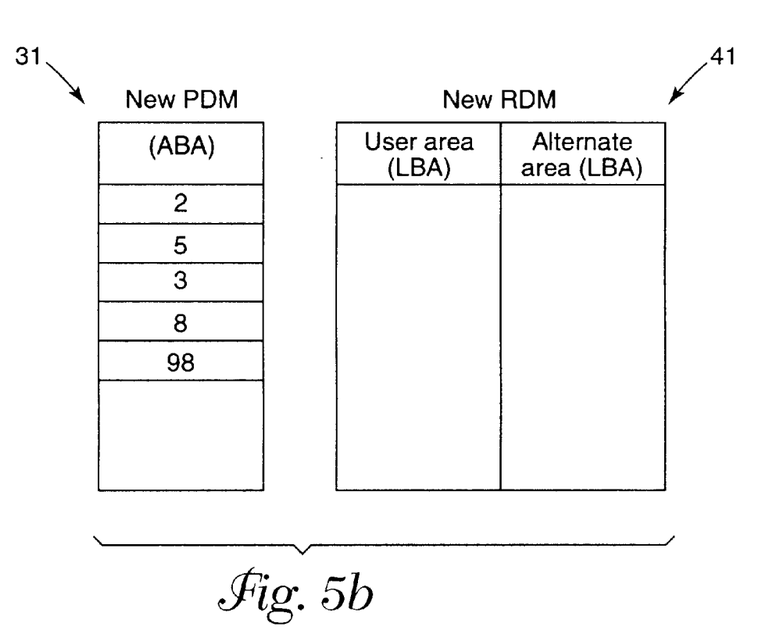

In step (6), to improve the transfer rate of the disk in which the alternate area is used because of the occurrence of secondary defect user sectors as shown in FIG. 4, a new PDM 31 and a new RDM 41 for moving the user data in the alternate sectors to user sectors are created by the CPU 51 as shown in FIG. 5(a). ABA 2 and ABA 5, primary defect user sectors existing before the shipment, and ABA 3, ABA 8, and ABA 98, secondary defect user sectors, are integrated into the new PDM 31. As a result, the new LBAs are sequentially assigned to the respective sectors, skipping all the sectors (ABA 2, ABA 3, ABA 5, ABA 8, and ABA 98) in which a defect occurs. The new RDM 41 corresponding to this becomes empty because the alternate areas need not be used. In addition, the actual user data is not yet moved at this point, and the addresses are maintained by the current PDM 30 and the current RDM 40.

Figure 9A:
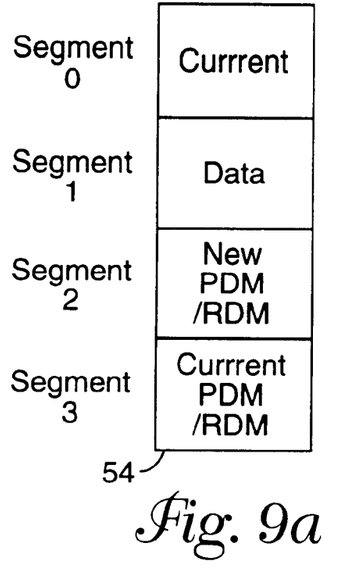
FIGS. 9(a)–(e) illustrate a segment configuration of the RAM 54.
Figure 9B:
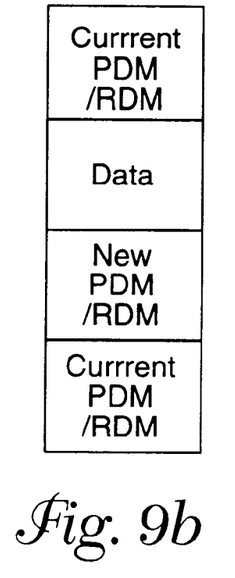

In step (7), the new PDM 31 and the new RDM 41 created in step (6) are stored in the management area 21 of the track 20. As a result, even if the defect processing is interrupted during the defect processing, it is not necessary to newly create a new PDM and a new RDM when the processing is resumed. In step (8), the new PDM 31 and the new RDM 41 are transferred to the segment 2 of the RAM 54 as shown in (a) of FIG. 9. In step (9), as shown in (b) of FIG. 9, the current PDM 30 and the current RDM 40 are transferred to the segment 0 within the RAM 54 so as to be executable by the CPU 55.

Figure 6A:
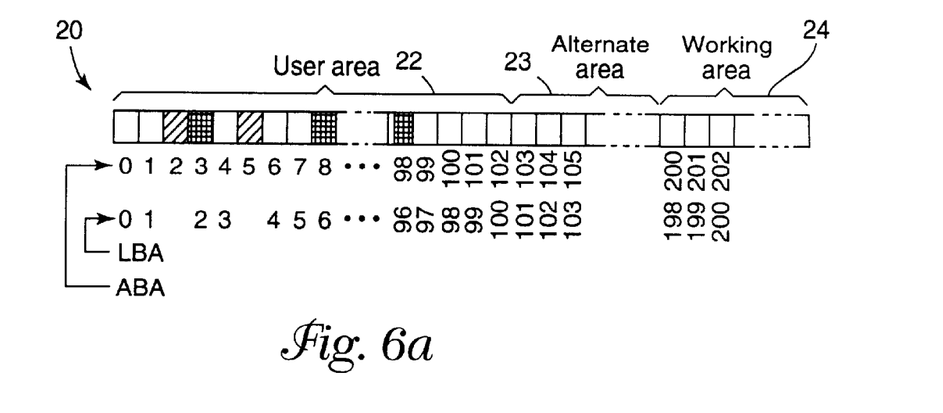
FIGS. 6(a)–(b) illustrate a track in which the user data in the alternate area was moved to the working area, and the corrected PDM and corrected RDM.
Figure 6B:
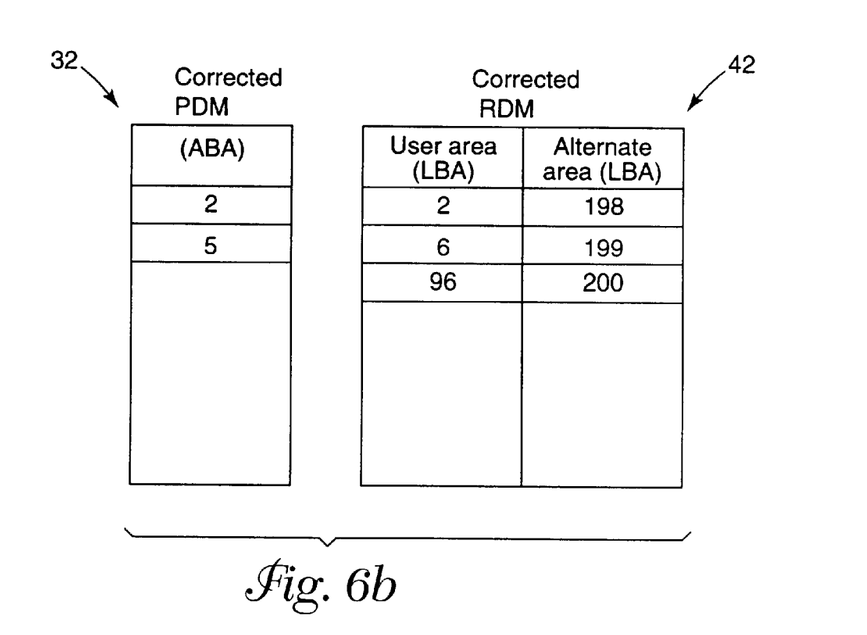

In step (10), a corrected RDM is created as shown in FIG. 6. To prevent user data from being overwritten and destroyed when the user data is moved for the defect sector management according to the present invention, the contents of the user data stored in the respective sectors LBA 101, LBA 102, and LBA 103 in the alternate area are temporarily transferred to sectors LBA 198, LBA 199, and LBA 200 in the working area 24, respectively, in step (13). The corrected RDM is a table for mapping the current LBAs of secondary defect user sectors using the alternate area 23 and the current LBAs of the working area 24. Since the current PDM 30 and the current RDM 40 are stored in the segment 0 of the RAM 54, the CPU 55 can use these to create a corrected PDM and a corrected RDM. Since the corrected PDM 32 is substantially the same as the current PDM 30, this can be diverted. In step (11), the created corrected PDM 32 and corrected RDM 42 are both stored in the management area 21 as in step (7).

Figure 9C:
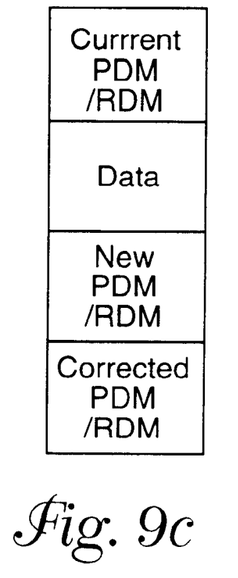
Figure 9D:
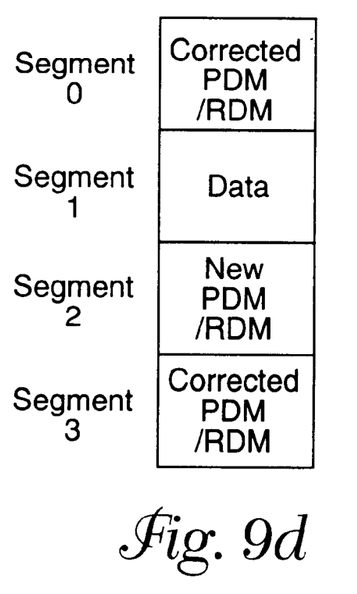
Figure 9E:
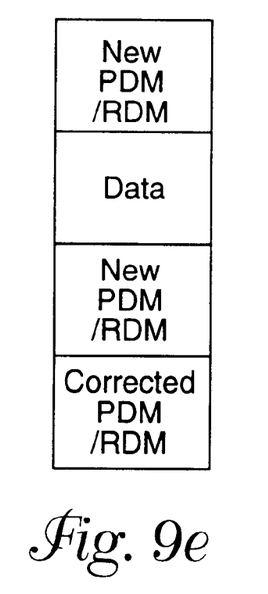
Figure 11:
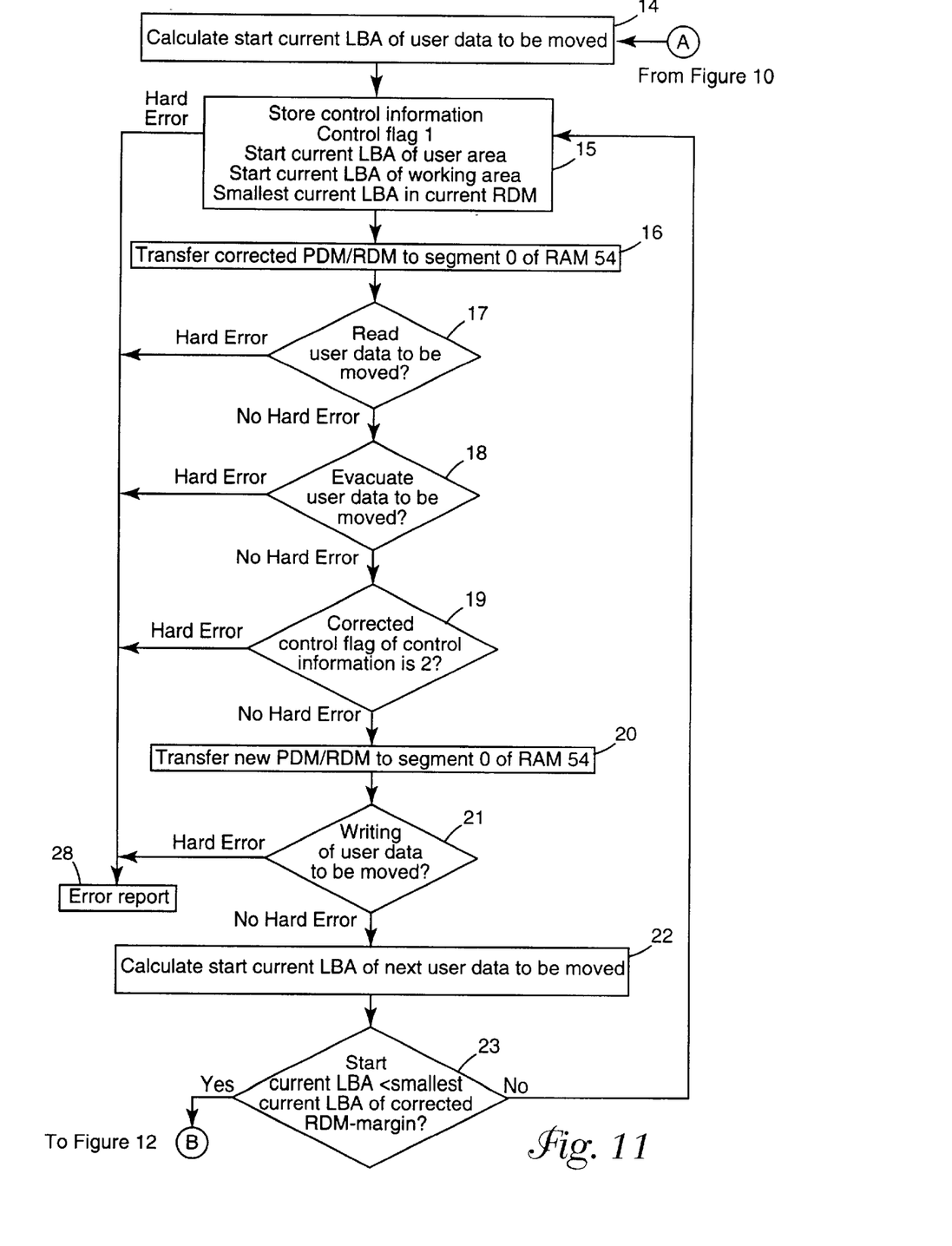
FIG. 11 is a flowchart representing the data moving process.

Then, in step (12), the corrected PDM 32 and the corrected RDM 42 are transferred to the segment 3 of the RAM 54 as shown in FIG. 9(c). In step (13), the user data stored in LBA 101, LBA 102, and LBA 103 are actually written to LBA 198, LBA 199, and LBA 200 of the working area 24. The CPU 55 executes this procedure with the current PDM 30 and the current RDM 40 transferred to the segment 0 of the RAM 54. If an error occurs during the execution of steps (2), (4), (11) and (13), the process does not move to the next step, but moves to step (28) where the error is processed by a predetermined procedure. The preparation process terminates in this way, and the procedure of the user data moving is described below according to the flowchart of FIG. 11.

Figure 7A:
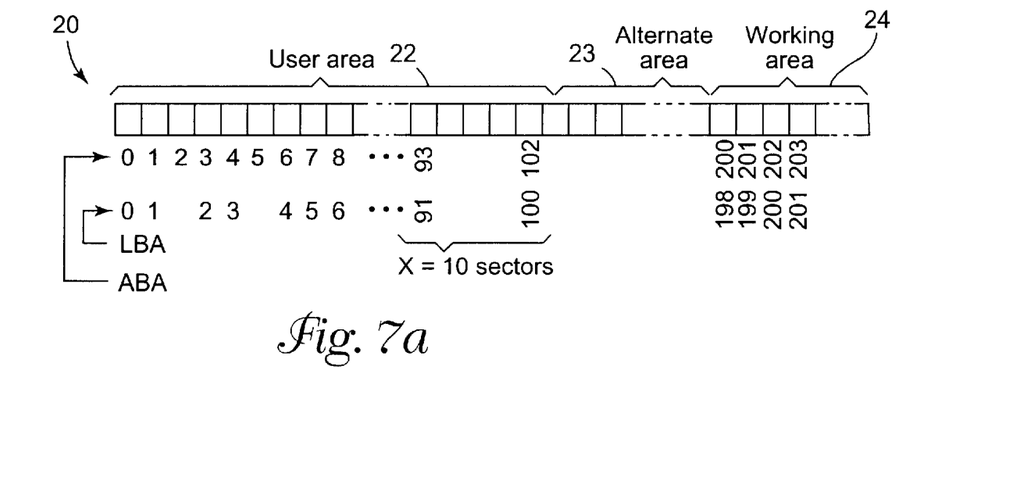
FIG. 7 is a track in which X sectors related to the moving was selected in the user sectors.

In step (14), when X sectors are moved at a time from the last position of the user area, as shown in FIG. 7, the start current LBA of a plurality of continuous sectors storing data read at a time is calculated. In this embodiment, the data in X=10 sectors are moved at a time. FIG. 7 shows the same track as the track shown in FIG. 6, and the start current LBA is the current LBA of the sector positioned on the side on which the address decreases by 10 sectors from the sector having the largest current LBA (in this case, the sector having LBA 100) among the current LBAs assigned to the user area 22. The start current LBA can be calculated by:

start current LBA=largest current LBA+1–X, and in this embodiment, since X is 10 and the largest current LBA is 100, the start sector is the sector having the current LBA 91. X can be selected according to the capacity of the RAM 54, and if X can be selected to be larger, the number of movings can be decreased to shorten the defect processing time.

In step (15), the control information accompanying the moving of user data is stored in the management area 21, and to enable the restart to be made at the interruption point even if an interruption occurs during the defect processing, information is sequentially held during the processing. As the control information, there is a control flag as the first place. The control flag is a pointer which shows three states: "0" representing a state in which data transfer is completed, "1" representing a state in which data related to a moving is stored in the original area, and "2" representing a state in which the data related to the moving is written to the working area. At this point, the control flag is changed to "1" to record a state in which the user data in the X sectors having LBA 91 to LBA 100 still remain in the original sectors. Further, the start current LBA of the working area 24 into which the start current LBA calculated in step 14 and the user data related to the moving are temporarily relocated is written to the management area 21. Since, in LBA 198 to LBA 200, the user data stored in the alternate area 23 for executing step (13) is written, the start current LBA of the working area is selected from the unused area in the working area. The start current LBA of the working area is selected so that at least X segments are continuously kept, and in FIG. 7, the sector of LBA 201 can be selected. Further, the smallest current LBA stored in the current RDM 40 is written to the management area 21. The smallest current LBA is 2 in this embodiment, and the smallest current LBA indicated that, for the user data stored in the user sectors assigned LBAs having numbers smaller than it, no moving for defect processing is required because there is no secondary defect user sector.

In step (16), the corrected PDM 32 and the corrected RDM 42 are transferred to the segment 0 of the RAM 54, as shown in (d) of FIG. 9. In step (17), X sectors from the user sector having the start current LBA 91 to the sector having the current LBA 100 are read by the CPU 55, and transferred to the segment 1 of the RAM 54. In step (18), the X user data having been read are written for evacuation to the sectors beginning from the start current LBA (for instance, LBA 201) of the working area which was calculated in step (15). By this, even if a write status check is carried out and a write error is found immediately after the X user data related to the moving area addressed with new LBAs in the subsequent steps and written to user sectors, the user data is not lost. In step (19), the management area 21 is rewritten so as to change the control flag to "2" in connection with step (15). As a result, since it can be judged that the user data is stored in the working area 24 even if the defect processing is interrupted after this point, the location of the user data is seen after the resumption of the processing, enabling the processing to be continued form the interrupted point.

In step (20), the new PDM 31 and the new RDM 41 are transferred to the segment 1 of the RAM 54, as shown in (e) of FIG. 9, to prepare the writing of the X user data read in step (17) to the user sectors having the new LBAs defined in the new PDM and the new RDM. In step (21), the X data read in in step (17) and stored in the sectors having the current LBA 91 to current LBA 100 of FIG. 7 are written to the user sectors having the new LBAs having the same numbers as the current LBAs defined by the new PDM and new RDM. For instance, the user data stored in the user sector having the current LBA 100 in FIG. 6 is stored in the user sector having the new LBA 100 as shown in FIG. 5. Since the new LBAs are assigned skipping the secondary defect user sectors of ABA 3, ABA 8, and ABA 98, the ABA of the user data stored in the current LBA 100 (ABA 102) is assigned the position of ABA 105 increased by three from ABA 102 (the new LBA is 100 which is the same number as the current LBA) as compared with that before the defect processing of FIG. 6. The sectors of ABA 103 to ABA 105 are originally assigned to the alternate area and used to store the data in secondary defect user sectors, but, since the data was already relocated to the working area 24 in step (13), the original data is not destroyed even if they are overwritten with different data by the moving of the X data. By moving the user data from the alternate area to the user area according to the new PDM and the new RDM, the user area is expanded, and a new working area is defined adjacently to the expanded user area.

In step (22), the next start current LBA is calculated by the following expression to move the next X data.

Next start current LBA=previous start current LBA-X

In this embodiment, it is 81. In step (23), it is determined whether the calculated next start current LBA is smaller than the smallest current LBA (in this embodiment, 2) contained in the corrected RDM 42. If the next start current LBA is larger, it is meant that the moving of user data is not ended, and the process returns to step (15) to repeat the subsequent same procedure. If it is determined that the next start current LBA is smaller even in view of a predetermined margin, the procedure of moving user data has all been completed. If the next start current LBA is smaller than the smallest current LBA in the corrected RDM 42, including at least a margin of X, all the user sectors selected to be moved next are sectors having addresses smaller than the secondary defect user sector having the smallest address, and for the user sectors in this range, the ABAs indicated by the current LBAs and the new LBAs are equal so that the moving of user data is not needed. If an error occurs in the execution of steps (15), (17), (18), (19) and (21), the process does not go to the next step, but goes to step (28) to perform a predetermined procedure. The moving process terminates as described above, and the post-processing is described below according to the flowchart of FIG. 12.

Figure 12:
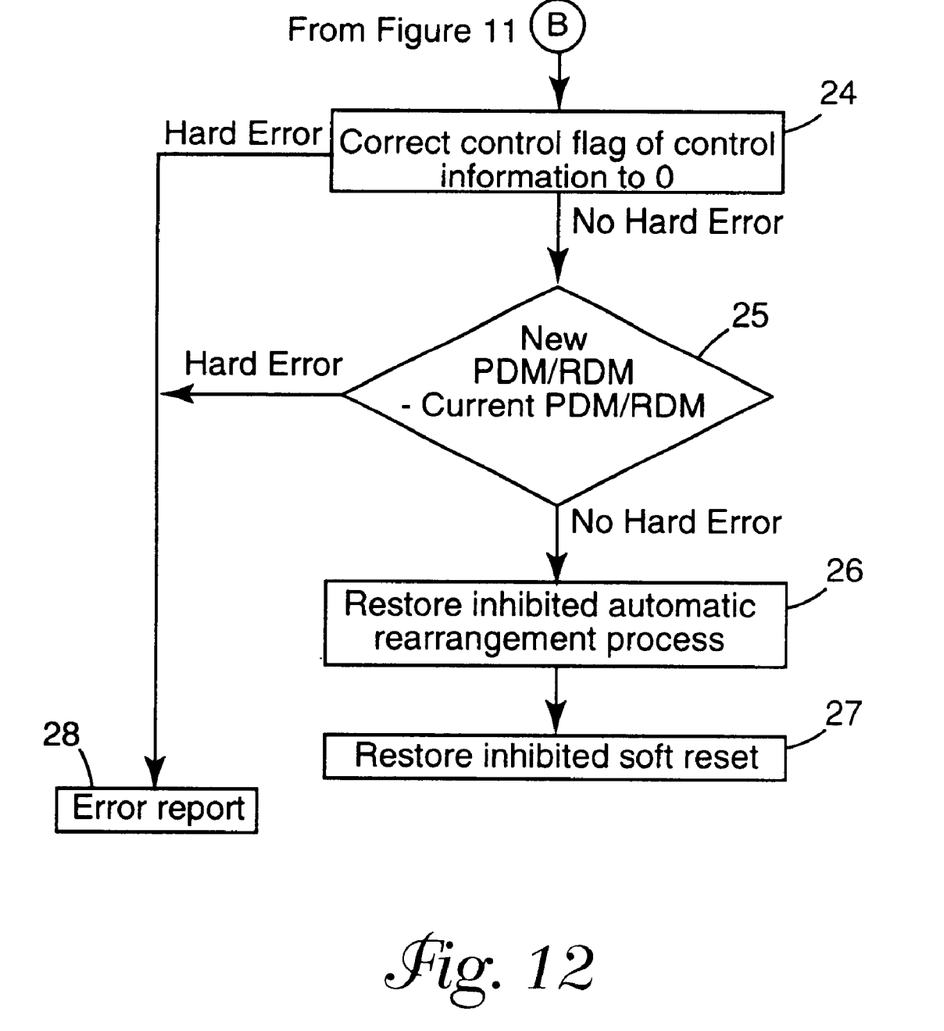
FIG. 12 is a flowchart representing the post-processing after the moving of data.

In step (24) of FIG. 12, the control flag is rewritten to "0" to record that the moving of user data has fully been completed. In step (25), the current PDM 30 and the current RDM 40 which are stored in the management area are renewed with the new PDM 31 and the new RDM 41 which are stored in the management area, and hereafter the new PDM 31 and the new RDM 41 are treated as the current PDM and RDM. In step (26), the automatic rearrangement process inhibited in step (3) is restored, and step (27), the soft reset inhibited in step (1) is restored, thereby to establish an environment in which the user can hereafter freely use the magnetic disk. If an error occurs in the execution of steps (24) and (25), the process does not move to the next step, but moves to step (28) to perform a predetermined procedure. With the above, the defect processing has fully been completed.

If an interruption due to power-down occurs during the execution of the defect processing, the processing can be resumed by the following procedure. After power-up, the status of the control flag is checked. If it is "0," it indicates that the process until and including step (24) has been completed, and thus the defect processing is not performed. If the control flag represents a state other than "0," the new PDM and new RDM and the corrected PDM and corrected RDM are transferred from the management area to the RAM 54. If the control flag is "1," it indicates that the user data related to the moving when the interruption occurred has been stored in the original user sectors, and thus the process can be continued form the state before the interruption if restarted from step (16). If the control flag is "2," it indicates that the user data related to the moving when the interruption occurred has been relocated to the working area, and thus the process can be restarted from step (20) so as to write the user data of the working area. Accordingly, the location of the user data related to the moving can be determined from the status of the control flag, so that the restart of the process after the interruption can be accurately and continuously performed.

Although the embodiment of the present invention has been described for an example in which the present invention is applied to a magnetic disk, it can be applied to general information storage media of the direct storage access type in which an alternate sector is used when a secondary defect user sector occurs, as is clear from the technical idea of the present invention. In the above embodiment, the PDM, the RDM, and the firmware program for implementing the present invention were stored in the management area of the disk, but, as apparent from the technical idea of the present invention, these may be stored in any other nonvolatile storage medium.

In accordance with the present invention, the reduction in the data transfer rate due to the user of the alternate area because of the occurrence of secondary defect user sectors could be recovered without destroying user data. The defect processing of sectors for the recovery could be implemented using a memory of a capacity much smaller than the capacity for all the user data, and it could be carried out without particularly preparing a special memory resource. The recent increase of the memory capacity of information storage media caused the defect processing to take a long time and increased the probability of the defect processing being interrupted by power-down, but, in the present invention, all the data which may be lost by the interruption are written to a disk and execution states are sequentially recorded, so that the processing can be restarted from the state immediately before the interruption when resumed after the interruption, thereby providing a safe and efficient method.

Further, a magnetic disk storage apparatus and a rearrangement processing apparatus for executing the method for managing defects of the present invention could be provided.

We claim:

1. In an information storage medium having user sectors for storing user data, and alternate sectors for storing the user data stored in secondary defect user sectors, wherein current logical block addresses (current LBAs) are sequentially assigned to said user sectors, a method for managing defect sectors by moving the user data stored in said alternate sectors to said user sectors, said managing method comprising the steps of:

(a) assigning new LBAs to said user sectors, skipping said secondary defect user sectors;

(b) selecting a predetermined number of sectors according to the current LBAs in descending order of address from said user sector having the largest current LBA;

(c) reading the user data in said selected predetermined number of sectors;

(d) writing said read user data to said user sectors according to said new LBAs;

(e) selecting a predetermined number of sectors according to the current LBAs in descending order of address from a sector having a current LBA immediately preceding a sector having the smallest current LBA among the predetermined number of sectors selected in said step (b);

(f) determining whether or not the smallest current LBA among the current LBAs respectively possessed by the predetermined number of selected sectors is smaller than the smallest LBA among the current LBAs respectively possessed by said secondary defect user sectors, wherein if it is determined to be smaller including a predetermined margin, said managing method is terminated without executing said step (g); and (g) repeating the steps (c) to (e).

2. In an information storage medium having user sectors for storing user data, and alternate sectors for storing the user data stored in secondary defect user sectors, wherein current logical block addresses (current LBAs) are sequentially assigned to said user sectors and said alternate sectors, a first sector having the smallest current LBA among said alternate sectors is adjacent to a second sector having the largest current LBA among said user sectors, and the user data stored in said secondary defect user sectors have been transferred to said alternate sectors sequentially from the first sector, a method for managing defect sectors by moving the user data stored in said alternate sectors to said user sectors, said managing method comprising the steps of:

(a) assigning new LBAs to said user sectors and said alternate sectors, skipping said secondary defect user sectors;

(b) relocating the user data stored in said alternate sectors while maintaining the association with said secondary user sectors;

(c) selecting a predetermined number of sectors according to the current LBAs in descending order of address from said second sector;

(d) reading the user data in said selected predetermined number of sectors;

(e) writing said read user data to said user sectors according to said new LBAs;

(f) selecting a predetermined number of sectors according to the current LBAs in descending order of address from a third sector having a current LBA immediately preceding a sector having the smallest current LBA among the predetermined number of sectors selected in said step (c);

(g) determining whether or not the smallest current LBA among the current LBAs respectively possessed by the predetermined number of selected sectors is smaller than the smallest LBA among the current LBAs respectively possessed by said secondary defect user sectors, wherein if it is determined to be smaller including a predetermined margin, said managing method is terminated without executing said step (h); and (h) repeating the steps (d) to (f).

3. In an information storage medium having user sectors for storing user data, and alternate sectors for storing the user data stored in secondary defect user sectors, wherein current logical block addresses (current LBAs) are sequentially assigned to said user sectors and said alternate sectors, a first sector having the smallest current LBA among said alternate sectors is adjacent to a second sector having the largest current LBA among said user sectors, and the user data stored in said secondary defect user sectors have been transferred to said alternate sectors sequentially from said first sector, a method for managing defect sectors by moving the user data stored in said alternate sectors to said user sectors, said managing method comprising the steps of:

(a) assigning new LBAs to said user sectors and said alternate sectors, skipping said secondary defect user sectors;

(b) relocating the user data stored in said alternate sectors while maintaining the association with said secondary defect user sectors;

(c) selecting a predetermined number of sectors according to the current LBAs in descending order of address from said second sector;

(d) reading the user data in said selected predetermined number of sectors;

(e) relocating said read user data while maintaining the association with said secondary defect user sectors;

(f) writing said read user data to said user sectors according to said new LBAs;

(g) selecting a predetermined number of sectors according to the current LBAs in descending order of address from a third sector having a current LBA immediately preceding a sector having the smallest current LBA among the predetermined number of sectors selected in said step (c);

(h) determining whether or not the smallest current LBA among the current LBAs respectively possessed by the predetermined number of selected sectors is smaller than the smallest LBA among the current LBAs respectively possessed by said secondary defect user sectors, wherein if it is determined to be smaller including a predetermined margin, said managing method is terminated without executing said step (i); and (i) repeating the steps (d) to (g).

4. In an information storage medium having user sectors for storing user data, and alternate sectors for storing the user data stored in secondary defect user sectors, wherein current logical block addresses (current LBAs) are sequentially assigned to said user sectors and said alternate sectors, a first sector having the smallest current LBA among said alternate sectors is adjacent to a second sector having the largest current LBA among said user sectors, and the user data stored in said secondary defect user sectors have been transferred to said alternate sectors sequentially from said first sector, a method for managing defect sectors by moving the user data stored in said alternate sectors to said user sectors, said managing method comprising the steps of:

(a) assigning new LBAs to said user sectors and said alternate sectors, skipping said secondary defect user sectors;

(b) relocating the user data stored in said alternate sectors while maintaining the association with said secondary defect user sectors;

(c) selecting a predetermined number of sectors according to the current LBAs in descending order of address from said second sector;

(d) setting a control flag to a first state;

(e) reading the user data in said selected predetermined number or sectors;

(f) relocating said read user data while maintain the association with said secondary defect user sectors;

(g) changing said control flag to a second state;

(h) writing said read user data to said user sectors according to said new LBAs;

(i) selecting a predetermined number of sectors according to the current LBAs in descending order of address from a third sector having a current LBA immediately preceding a sector having the smallest current LBA among the predetermined number of sectors selected in said step (c);

(j) determining whether or not the smallest current LBA among the current LBAs respectively possessed by the predetermined number of selected sectors is smaller than the smallest LBA among the current LBAs respectively possessed by said secondary defect user sectors, wherein if it is determined to be smaller including a predetermined margin, said managing method is terminated without executing said step (k); and (k) repeating the steps (d) to (l).

5. An information recording and reproducing apparatus comprising:

an information storage medium having a plurality of user sectors, and alternate sectors for storing the user data stored in secondary defect user sectors;

a driving unit for positioning said transducer at a predetermined position of said information storage medium; and a CPU for controlling the operation of said driving unit so as to write and read data to and from said information storage medium using one or more transducer elements, and position said transducer element at a predetermined address on the information storage medium;

wherein said CPU controls said driving unit so as to sequentially assign new LBAs to said user sectors, skipping said secondary defect user sectors, to select a predetermined number of sectors according to the current LBAs in descending order of address from said user sector assigned the largest current LBA, and to read the user data in said selected predetermined number of sectors, and controls said driving unit so as to write said read user data to said user sectors according to said new LBAs, and controls said driving unit so as to select a predetermined number of sectors according to the current LBAs in descending order of address from a sector having a current LBA immediately preceding a sector having the smallest current LBA among said selected predetermined number of sectors, to determine whether or not the smallest current LBA among the current LBAs respectively possessed by the predetermined number of selected sectors is smaller than the smallest LBA among the current LBAs respectively possessed by said secondary defect user sectors, wherein the CPU terminates defect sector management prior to repeating reading of the user data if it is determined to be smaller including a predetermined margin, and to repeat the reading according to said current LBA and writing according to said new LBA.

6. An information recording and reproducing apparatus comprising:

an information storage medium having a plurality of user sectors, and alternate sectors for storing the user data stored in secondary defect user sectors;

a transducer element for reading or writing data from or to said information storage medium;

a driving unit for positioning said transducer element at a predetermined position of said information storage medium; and a CPU which executes a firmware program which sequentially assigns new LBAs to said user sectors, skipping said secondary defect user sectors, selects a predetermined number of sectors according to the current LBAs in descending order of address from said user sector assigned the largest current LBA, and reads the user data in said selected predetermined number of sectors, and controls said driving unit so as to write said read user data to said user sectors according to said new LBAs, and controls said driving unit so as to select a predetermined number of sectors according to the current LBAs in descending order of address from a sector having a current LBA immediately preceding a sector having the smallest current LBA among said selected predetermined number of sectors, and determines whether or not the smallest current LBA among the current LBAs respectively possessed by the predetermined number of selected sectors is smaller than the smallest LBA among the current LBAs respectively possessed by said secondary defect user sectors, wherein the CPU terminates defect sector management prior to repeating reading of the user data if it is determined to be smaller including a predetermined margin, and repeats the reading according to said current LBA and writing according to said new LBA.

7. An information recording and reproducing apparatus as set forth in claim 6, further comprising a memory connected to said CPU, wherein said program is stored on said information storage medium.

8. In an information storage medium having user sectors for storing user data, and alternate sectors for storing the user data stored in secondary defect user sectors, wherein current logical block addresses (current LBAs) are assigned to said user sectors in descending order, a method for managing defect sectors by moving the user data stored in said alternate sectors to said user sectors, said managing method comprising the steps of:

(a) assigning new LBAs to said user sectors, skipping said secondary defect user sectors;

(b) selecting a predetermined number of sectors according to the current LBAs in increasing order of address from said used sector having the smallest current LBA;

(c) reading the user data in said selected predetermined number of sectors;

(d) writing said read user data to said user sectors according to said new LBA;

(e) selecting a predetermined number of sectors according to the current LBAs in increasing order of address from a sector having a current LBA immediately preceding a sector having the largest current LBA among the predetermined number of sectors selected in said step (b);

(f) determining whether or not the largest current LBA among the current LBAs respectively possessed by the predetermined number of selected sectors is greater than the largest LBA among the current LBAs respectively possessed by said secondary defect user sectors, wherein if it is determined to be larger including a predetermined margin, said managing method is terminated without executing said step (g); and (g) repeating the steps (c) to (e).

* * * * *